United States Patent
Nomoto et al.

(10) Patent No.: US 12,106,048 B2
(45) Date of Patent: Oct. 1, 2024

(54) STRUCTURED TEXT PROCESSING LEARNING APPARATUS, STRUCTURED TEXT PROCESSING APPARATUS, STRUCTURED TEXT PROCESSING LEARNING METHOD, STRUCTURED TEXT PROCESSING METHOD AND PROGRAM

(71) Applicant: NIPPON TELEGRAPH AND TELEPHONE CORPORATION, Tokyo (JP)

(72) Inventors: Narichika Nomoto, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 323 days.

(21) Appl. No.: 17/630,491

(22) PCT Filed: Aug. 1, 2019

(86) PCT No.: PCT/JP2019/030277
§ 371 (c)(1),
(2) Date: Jan. 26, 2022

(87) PCT Pub. No.: WO2021/019773
PCT Pub. Date: Feb. 4, 2021

(65) Prior Publication Data
US 2022/0269856 A1  Aug. 25, 2022

(51) Int. Cl.
*G06F 40/216* (2020.01)
*G06F 40/137* (2020.01)
(Continued)

(52) U.S. Cl.
CPC .......... *G06F 40/216* (2020.01); *G06F 40/137* (2020.01); *G06V 30/19147* (2022.01); *G06V 30/41* (2022.01)

(58) Field of Classification Search
CPC ................ G06F 40/216; G06F 40/137; G06V 30/19147; G06V 30/41
See application file for complete search history.

(56) References Cited

U.S. PATENT DOCUMENTS

| | | | |
|---|---|---|---|
| 2005/0021542 A1* | 1/2005 | Irle ........................ | G06F 16/986 707/E17.118 |
| 2011/0113046 A1* | 5/2011 | Isozu .................... | G06F 40/221 707/754 |

(Continued)

OTHER PUBLICATIONS

Nishida et al. (2018) "Retrieve-and-read: Multi-task learning of information retrieval and reading comprehension," Proc. of CIKM 2018, pp. 647-656, Torino, Italy, Oct. 2018.
(Continued)

*Primary Examiner* — Abul K Azad

(57) ABSTRACT

A structured text processing learning apparatus includes a memory, and a processor configured to: analyze a structure of structured text, extract, from the structured text, information related to a predetermined structure to be extracted based on the structure, generate a converted document including text data in which each string indicating a structure of the extracted information has been converted, in accordance with the structure related to the extracted information, and train a neural network for executing predetermined processing for the converted document, using, as input, the generated converted document and correct answer information for performing the predetermined processing. Thus, application of a neural network to structured text is facilitated.

8 Claims, 17 Drawing Sheets

(51) Int. Cl.
*G06V 30/19* (2022.01)
*G06V 30/41* (2022.01)

(56) References Cited

U.S. PATENT DOCUMENTS

| | | | |
|---|---|---|---|
| 2012/0259878 A1* | 10/2012 | Iguchi | G06F 16/80 |
| | | | 707/758 |
| 2017/0371956 A1* | 12/2017 | Allen | G06F 16/313 |
| 2018/0300315 A1* | 10/2018 | Leal | G06F 40/268 |
| 2020/0151574 A1* | 5/2020 | Matsuo | G06N 3/084 |
| 2023/0042546 A1* | 2/2023 | Trischler | G06F 40/30 |

OTHER PUBLICATIONS

Yonei et al. (2008) "Person Retrieval on XML Documents by Coreference that Uses Structural Features" Journal of the DBSJ, Jun. 27, 2008, vol. 7, No. 1, pp. 151-156, ISSN 1883-1060, in particular, chapter 3.

* cited by examiner

FIG.1

```
<h2> TERMS OF OFFER </h2>
    <h3> UNAVAILABLE OPTIONS </h3>   ← t1
        <p> xxxTV, TV OPTION, yyyPHONE </p>
    <h3> NUMBER OF CONTRACTS AVAILABLE </h3>
        <p> UP TO 5N CAN APPLY UNDER THE SAME NAME </p>
        <p> UP TO 5 SIMS CAN BE APPLIED PER 1N </p>
```

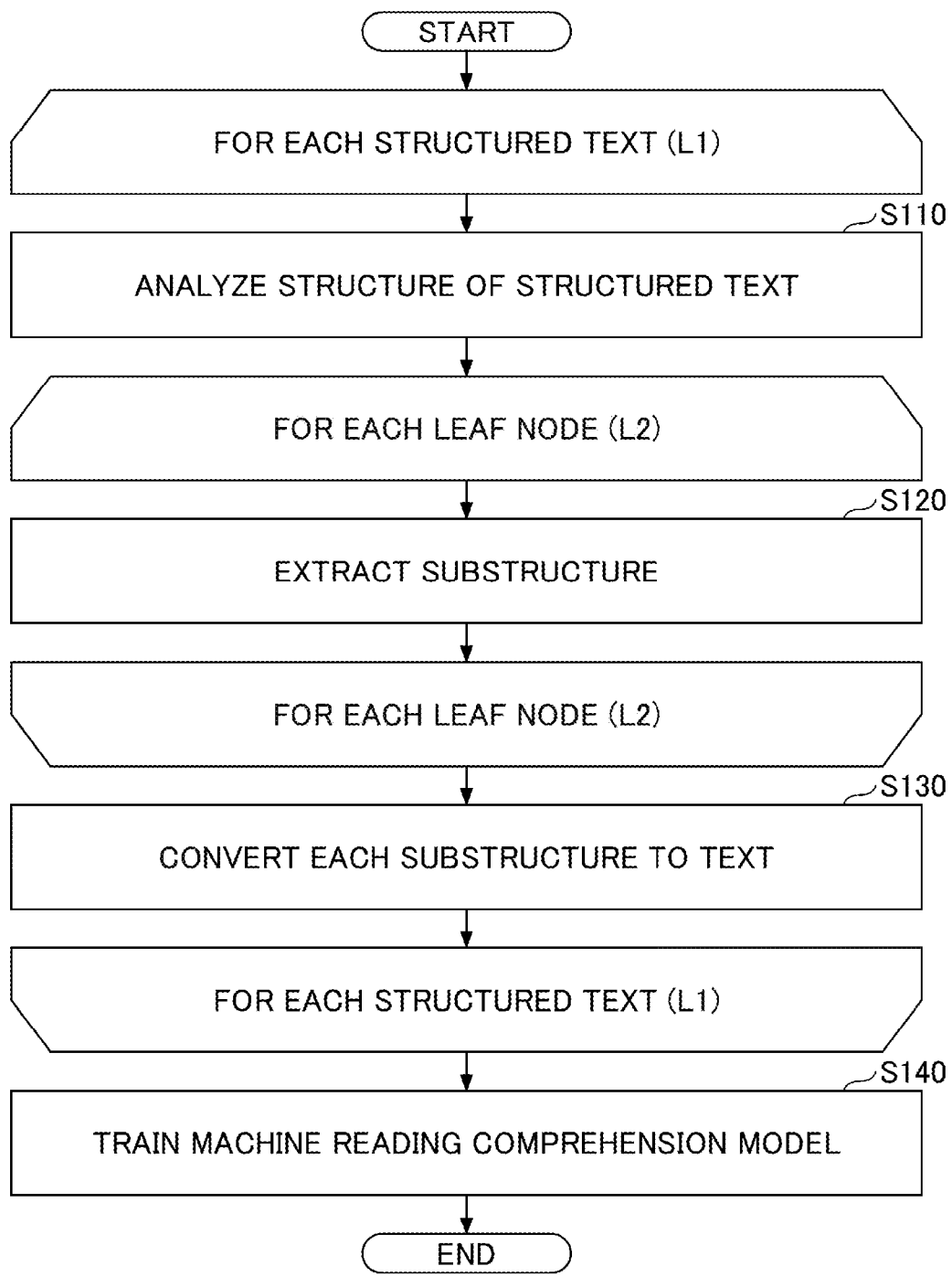

FIG.5

```
<section>
<h2> TERMS OF OFFER </h2>
<section>
<h3> UNAVAILABLE OPTIONS </h3>
<p> xxxTV, TV OPTION, yyyPHONE </p>
</section>
<section>
<h3> NUMBER OF CONTRACTS AVAILABLE </h3>
<p> UP TO 5N CAN APPLY UNDER THE SAME NAME </p>
<p> UP TO 5 SIMS CAN BE APPLIED PER 1N </p>
</section>
</section>
```

⇩ ANALYZED

```
<h2> TERMS OF OFFER </h2>
    ├── <h3> UNAVAILABLE OPTIONS </h3>
    │       └── <p> xxxTV, TV OPTION, yyyPHONE </p>
    └── <h3> NUMBER OF CONTRACTS AVAILABLE </h3>
            ├── <p> UP TO 5N CAN APPLY UNDER THE SAME NAME </p>
            └── <p> UP TO 5 SIMS CAN BE APPLIED PER 1N </p>
```

FIG.6

```
                                                                    ⌒s1
┌─────────────────────────────────────────────────────────────────────┐
│ <h2> TERMS OF OFFER </h2>                                           │
│    │                                                                │
│    ├────<h3> UNAVAILABLE OPTIONS </h3>                              │
│    │       │                                                        │
│    │       └────<p> xxxTV, TV OPTION, yyyPHONE </p>                 │
│    │                                                                │
│    └────<h3> NUMBER OF CONTRACTS AVAILABLE </h3>                    │
│            │                                                        │
│            ├────<p> UP TO 5N CAN APPLY UNDER THE SAME NAME </p>     │
│            │                                                        │
│            └────<p> UP TO 5 SIMS CAN BE APPLIED PER 1N </p>         │
└─────────────────────────────────────────────────────────────────────┘
```

```
                                                                    ⌒s1-1
┌─────────────────────────────────────────────────────────────────────┐
│ <h2> TERMS OF OFFER </h2>                                           │
│    │                                                                │
│    └────<h3> UNAVAILABLE OPTIONS </h3>                              │
│            │                                                        │
│            └────<p> xxxTV, TV OPTION, yyyPHONE </p>                 │
└─────────────────────────────────────────────────────────────────────┘

⌒s1-2
┌─────────────────────────────────────────────────────────────────────┐
│ <h2> TERMS OF OFFER </h2>                                           │
│    │                                                                │
│    └────<h3> NUMBER OF CONTRACTS AVAILABLE </h3>                    │
│            │                                                        │
│            └────<p> UP TO 5N CAN APPLY UNDER THE SAME NAME </p>     │
└─────────────────────────────────────────────────────────────────────┘

⌒s1-3
┌─────────────────────────────────────────────────────────────────────┐
│ <h2> TERMS OF OFFER </h2>                                           │
│    │                                                                │
│    └────<h3> NUMBER OF CONTRACTS AVAILABLE </h3>                    │
│            │                                                        │
│            └────<p> UP TO 5 SIMS CAN BE APPLIED PER 1N </p>         │
└─────────────────────────────────────────────────────────────────────┘
```

FIG.8

ADDITIONAL CAPACITY OPTION — p1

EVEN IF YOU USE UP ALL OF YOUR COMMUNICATION CAPACITY AND THE SPEED LIMIT IS IMPOSED, YOU CAN CANCEL THE SPEED LIMIT BY APPLYING FOR THE ADDITIONAL CAPACITY OPTION.

OVERVIEW

ADDITIONAL CAPACITY IS REFLECTED IN REAL TIME.
ADDITIONAL CAPACITY ALSO SUPPORTS TURBO ON/OFF.
IN THE CASE OF MULTIPLE SIM CONTRACTS, ADDITIONAL CAPACITY WILL BE SHARED AMONG ALL THE SIMS CONTRACTED. (ADDITIONAL CAPACITY CANNOT BE ADDED TO A SPECIFIC SIM ONLY)
ADDITIONAL CAPACITY CANNOT BE CANCELED.
FREE FIRST MONTH FEE IS NOT APPLIED TO THIS OPTION.
[MONTHLY COURSE, SPEED LIMIT COURSE]
PURCHASED ADDITIONAL CAPACITY CAN BE CARRIED OVER UNTIL THE END OF THE THIRD MONTH AFTER THE MONTH OF PURCHASE.
0.5 GB CAN BE ADDED AT A TIME, AND APPLICATION CAN BE MADE UP TO SIX TIMES IN A MONTH (= UP TO 3 GB). CAPACITY WILL BE CONSUMED FROM THE ONE CLOSEST TO THE EXPIRATION DATE. (IF THERE IS BASIC CAPACITY AND ADDITIONAL CAPACITY WITH THE SAME EXPIRATION DATE, THE ADDITIONAL CAPACITY WILL BE CONSUMED FIRST.)
IN THE CASE OF THE SPEED LIMIT COURSE, ONLY THE ADDITIONAL CAPACITY CAN BE USED WITH TURBO ON (788 Mbps).

| JANUARY | FEBRUARY | MARCH | APRIL | MAY | JUNE |
|---|---|---|---|---|---|
| APPLY FOR ADDITIONAL CAPACITY (A) +0.5 GB | APPLY FOR ADDITIONAL CAPACITY (B) +0.5 GB | EFFECTIVE UNTIL THE END OF THE MONTH AFTER THREE MONTHS | EFFECTIVE UNTIL THE END OF THE MONTH AFTER THREE MONTHS | | |

— p2

IF MORE THAN ONE APPLICATION, E.G., APPLICATIONS A AND B ARE MADE AS IN THE EXAMPLE, THE CAPACITY FOR APPLICATION A WITH THE CLOSER EXPIRATION DATE WILL BE CONSUMED FIRST.

[DAILY] COURSE — p3

ADDITIONAL CAPACITY WILL BE PROVIDED AS "UNLIMITED USAGE FOR ONE DAY".
CAPACITY FOR THE SAME DAY CAN BE ADDED AT A TIME, AND APPLICATION CAN BE MADE UP TO SIX TIMES IN A MONTH (= UP TO SIX DAYS).
THE ADDITIONAL CAPACITY IS EFFECTIVE IMMEDIATELY AFTER THE APPLICATION IN REAL TIME AND CAN BE USED UNLIMITEDLY UNTIL 23:59 ON THE SAME DAY.

FIG.11

```
<h2> TERMS OF OFFER </h2>
<h3> UNAVAILABLE OPTIONS </h3>
<p>xxxTV, TV OPTION, yyyPHONE </p>
<h3> NUMBER OF CONTRACTS AVAILABLE </h3>
<p> UP TO 5N CAN APPLPY UNDER THE SAME NAME </p>
<p> UP TO 5 SIMS CAN BE APPLIED PER 1N </p>
```

(1)

| | |
|---|---|
| <h2> | TERMS OF OFFER |
| <h3> | UNAVAILABLE OPTIONS |
| <p> | xxxTV, TV OPTION, yyyPHONE |
| <h3> | NUMBER OF CONTRACTS AVAILABLE |
| <p> | UP TO 5N CAN APPLPY UNDER THE SAME NAME |
| <p> | UP TO 5 SIMS CAN BE APPLIED PER 1N |

(2)

[EXAMPLE INPUT]

<h1> CONTENT STRING X </h1><h2> CONTENT STRING Y </h2>

[EXAMPLE COMBINATION]

(a) <h1> CONTENT STRING X </h1><h2> CONTENT STRING Y </h2>

(b) <h1> CONTENT STRING X <h2> CONTENT STRING Y (c) CONTENT STRING X </h1> CONTENT STRING Y </h2>

(d) CONTENT STRING X </h1><h2> CONTENT STRING Y (e) CONTENT STRING X <h2> CONTENT STRING Y (f) CONTENT STRING X </h1> CONTENT STRING Y

FIG.12

[EXAMPLE INPUT]

(a) <h1> CONTENT STRING X </h1><h2> CONTENT STRING Y </h2>

(b) <h1> CONTENT STRING X <h2> CONTENT STRING Y (c) CONTENT STRING X </h1> CONTENT STRING Y </h2>

(d) CONTENT STRING X </h1><h2> CONTENT STRING Y (e) CONTENT STRING X <h2> CONTENT STRING Y (f) CONTENT STRING X </h1> CONTENT STRING Y

[EXAMPLE DEGENERATION]

(a') <TAG> CONTENT STRING X <TAG><TAG> CONTENT STRING Y <TAG>

(b') <TAG> CONTENT STRING X <TAG> CONTENT STRING Y (c') CONTENT STRING X <TAG> CONTENT STRING Y <TAG>

(d') CONTENT STRING X <TAG><TAG> CONTENT STRING Y (e') CONTENT STRING X <TAG> CONTENT STRING Y (f') CONTENT STRING X <TAG> CONTENT STRING Y

|  | PLAN A | PLAN B |
|---|---|---|
| SERVICE X | 500 YEN | 300 YEN |
| SERVICE Y | 800 YEN | 1000 YEN |

(1)

(2)
```
PLAN A <TAG> SERVICE X <TAG> 500 YEN
PLAN B <TAG> SERVICE X <TAG> 300 YEN
PLAN A <TAG> SERVICE Y <TAG> 800 YEN
PLAN B <TAG> SERVICE Y <TAG> 1000 YEN
```

(3)
```
PLAN A <AND> SERVICE X <SUPERORDINATE-SUBORDINATE> 500 YEN
PLAN B <AND> SERVICE X <SUPERORDINATE-SUBORDINATE> 300 YEN
PLAN A <AND> SERVICE Y <SUPERORDINATE-SUBORDINATE> 800 YEN
PLAN B <AND> SERVICE Y <SUPERORDINATE-SUBORDINATE> 1000 YEN
```

FIG.17

| UNIT OF DIVISION | PARAGRAPH UNIT | LEAF NODE UNIT | LEAF NODE UNIT |
|---|---|---|---|
| DEGENERATION OF META STRINGS | NOT DEGENERATED | NOT DEGENERATED | DEGENERATED |
| EVALUATION SET A | 34.5% | 68.5% | 80.0% |
| EVALUATION SET B | 16.5% | 44.6% | 66.1% |

STRUCTURED TEXT PROCESSING
LEARNING APPARATUS, STRUCTURED
TEXT PROCESSING APPARATUS,
STRUCTURED TEXT PROCESSING
LEARNING METHOD, STRUCTURED TEXT
PROCESSING METHOD AND PROGRAM

CROSS-REFERENCE TO RELATED
APPLICATIONS

This application is a U.S. National Stage Application filed under 35 U.S.C. § 371 claiming priority to International Patent Application No. PCT/JP2019/030277, filed on 1 Aug. 2019, the disclosure of which is hereby incorporated herein by reference in its entirety.

TECHNICAL FIELD

The present invention relates to a structured text processing learning apparatus, a structured text processing apparatus, a structured text processing learning method, a structured text processing method, and a program.

BACKGROUND ART

In recent years, natural language processing using neural networks has been rapidly developing. For example, progress has also been made in machine reading comprehension technology (e.g., NPL 1). The machine reading comprehension technology is technology that enables question answering based on natural language understanding using text as a knowledge source, and is technology for automatically finding answers to questions in the text.

CITATION LIST

Non Patent Literature

[NPL 1] K. Nishida, I. Saito, A. Otsuka, H. Asano, and J. Tomita: "Retrieve-and-read: Multi-task learning of information retrieval and reading comprehension," Proc. of CIKM 2018, pp. 647-656, Torino, Italy, October 2018.

SUMMARY OF THE INVENTION

Technical Problem

A document set used in natural language processing using neural networks, such as the machine reading comprehension technology, is assumed to be text without any structure. Meanwhile, since processing of structured text using neural networks requires understanding of structural information, structured text in their original state are difficult to apply to neural networks.

The present invention has been made in view of the foregoing, and an object of the present invention is to facilitate application of a neural network to structured text.

Means for Solving the Problem

To solve the above problem, structured text processing learning device includes a memory, and a processor configured to analyze a structure of structured text, extract, from the structured text, information related to a predetermined structure to be extracted based on the structure, generate a converted document including text data in which each string indicating a structure of the extracted information has been converted, in accordance with the structure related to the extracted information, and train a neural network for executing predetermined processing for the converted document, using, as input, the generated converted document and correct answer information for performing the predetermined processing.

Effects of the Invention

Application of a neural network to structured text can be facilitated.

BRIEF DESCRIPTION OF DRAWINGS

FIG. 1 is a diagram for illustrating a structural meaning of a tag in an HTML document.
FIG. 4 is a flowchart for illustrating an example of a processing procedure executed to train a machine reading comprehension model by the structured text processing apparatus 10 of the first embodiment.
FIG. 5 is a diagram for illustrating analysis of a hierarchical structure.
FIG. 6 is a diagram illustrating example extraction of substructures.
FIG. 8 is a diagram illustrating an example display of an HTML document that includes an answer to a question.
FIG. 11 is a diagram illustrating examples of extraction results obtained by an extraction unit 113.
FIG. 12 is a diagram illustrating example combinations of meta strings and content strings.
FIG. 13 is a diagram illustrating example degeneration of meta strings.
FIG. 16 is a diagram illustrating example conversion of a table.
FIG. 17 is a diagram illustrating experimental results.

DESCRIPTION OF EMBODIMENTS

Hereinafter, embodiments of the present invention will be described with reference to the drawings. The embodiments will describe a document described in HyperText Markup Language (HTML) (HTML document) as an example of structured text. Further, the description will be given while taking a neural network related to the machine reading comprehension technology (hereinafter referred to as a "machine reading comprehension model") as an example of a neural network for executing natural language processing. However, for example, the present embodiments may be applied to structured text described in other formats, such as eXtensible Markup Language (XML). The present embodiments may also be applied to various kinds of natural language processing other than machine reading comprehension, such as automatic summarization and document classification processing.

The present embodiments disclose a method for converting an HTML document to text in a format that is readable for the machine reading comprehension model and that preserves structural information.

When structured text, such as an HTML document, is read by the machine reading comprehension model, it is conceivable that the structured text is read on a unit (element)-by-unit bases, the units being separated by strings expressing a structure of the structured text (hereinafter referred to as "meta strings"), such as a tree structure. Note that, in HMTL documents, HMTL tags correspond to the meta strings.

However, this method is considered to be not realistic due to the following reasons.

There are various HTML expression methods for the same description content.

The same meta string (HTML tag) has different usages (meanings) depending on the document.

It is difficult to treat and read meta strings (HTML tags) similarly to ordinary words.

When what the "structure" of structured text means is examined, it is considered that what is important about the structure of structured text is not the type of meta string (tag type), but a superordinate-subordinate relationship (inclusion relationship) and a parallel relationship between elements that are expressed by meta strings and enclosed by meta strings.

FIG. 1 is a diagram for illustrating a structural meaning of a tag in an HTML document. In the structural information regarding the HTML document illustrated in FIG. 1, a tag t1 has the following three structural meanings, for example.

Being subordinate to the "Terms of Offer"
Being superordinate to "xxx TV . . . "
Being parallel with "Number of Contracts Available"

In the first embodiment, the structure of an HTML document is divided such that the structural meaning of a tag is uniquely determined to eliminate fluctuation of the tag. Thus, this HTML document is converted to a format that is readable for the machine reading comprehension model and that preserves the structural information regarding the HTML document.

Figure 2:
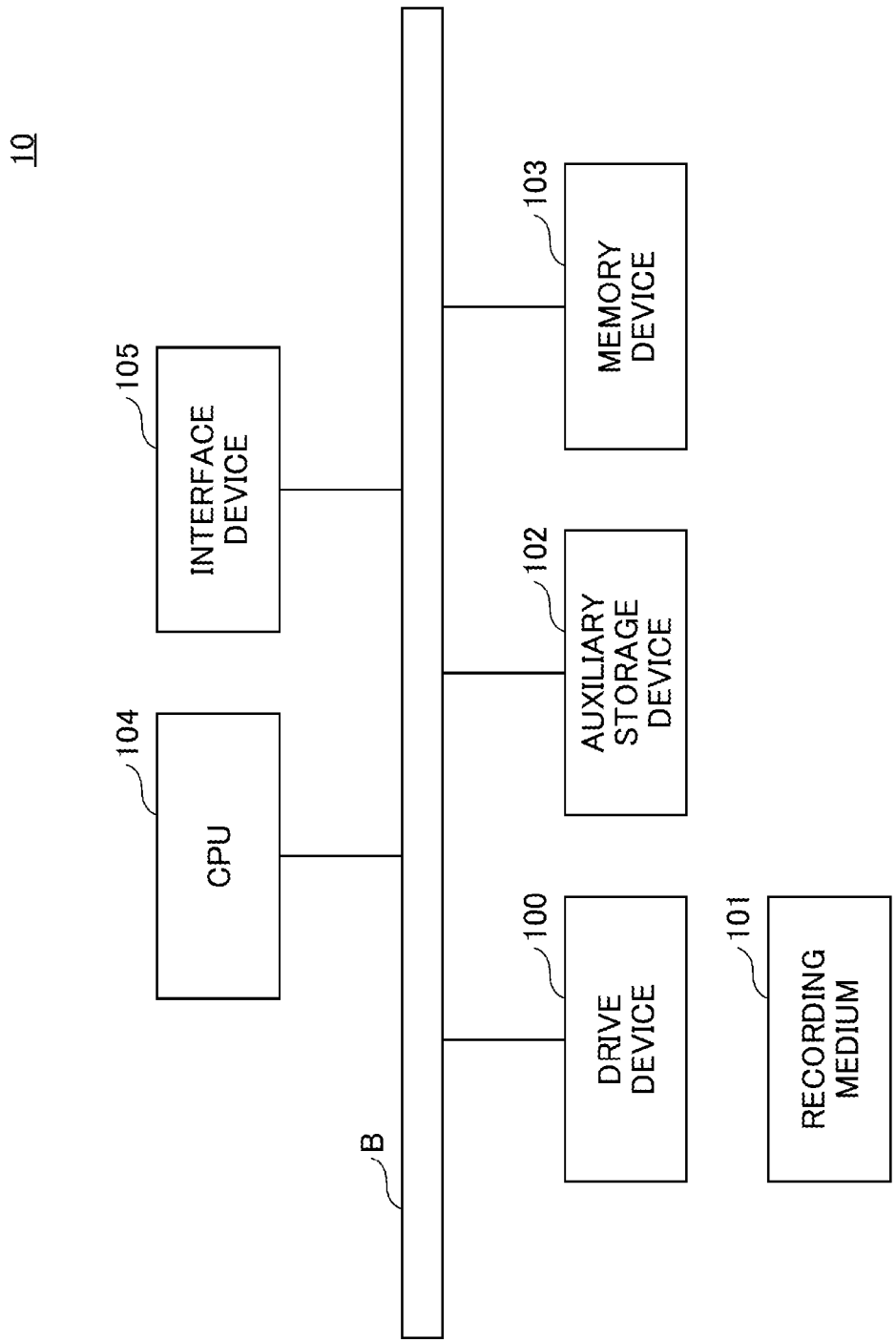
FIG. 2 is a diagram illustrating an example hardware configuration of a structured text processing apparatus 10 according to a first embodiment.

FIG. 2 is a diagram illustrating an example hardware configuration of a structured text processing apparatus 10 according to the first embodiment. The structured text processing apparatus 10 in FIG. 2 has a drive device 100, an auxiliary storage device 102, a memory device 103, a CPU 104, an interface device 105, and so on, which are connected to each other by a bus B.

A program that realizes processing in the structured text processing apparatus 10 is provided by a recording medium 101, such as a CD-ROM. Upon the recording medium 101 in which the program is stored being set to the drive device 100, the program is installed in the auxiliary storage device 102 from the recording medium 101 via the drive device 100. However, the program does not necessarily need to be installed from the recording medium 101, and may alternatively be downloaded from other computers via a network.

The auxiliary storage device 102 stores the installed program, and also stores necessary files, data, or the like.

If an instruction to start the program is given, the memory device 103 loads the program from the auxiliary storage device 102 and stores the loaded program. The CPU 104 executes functions related to the structured text processing apparatus 10 in accordance with the program stored in the memory device 103. The interface device 105 is used as an interface for connecting to the network.

Figure 3:
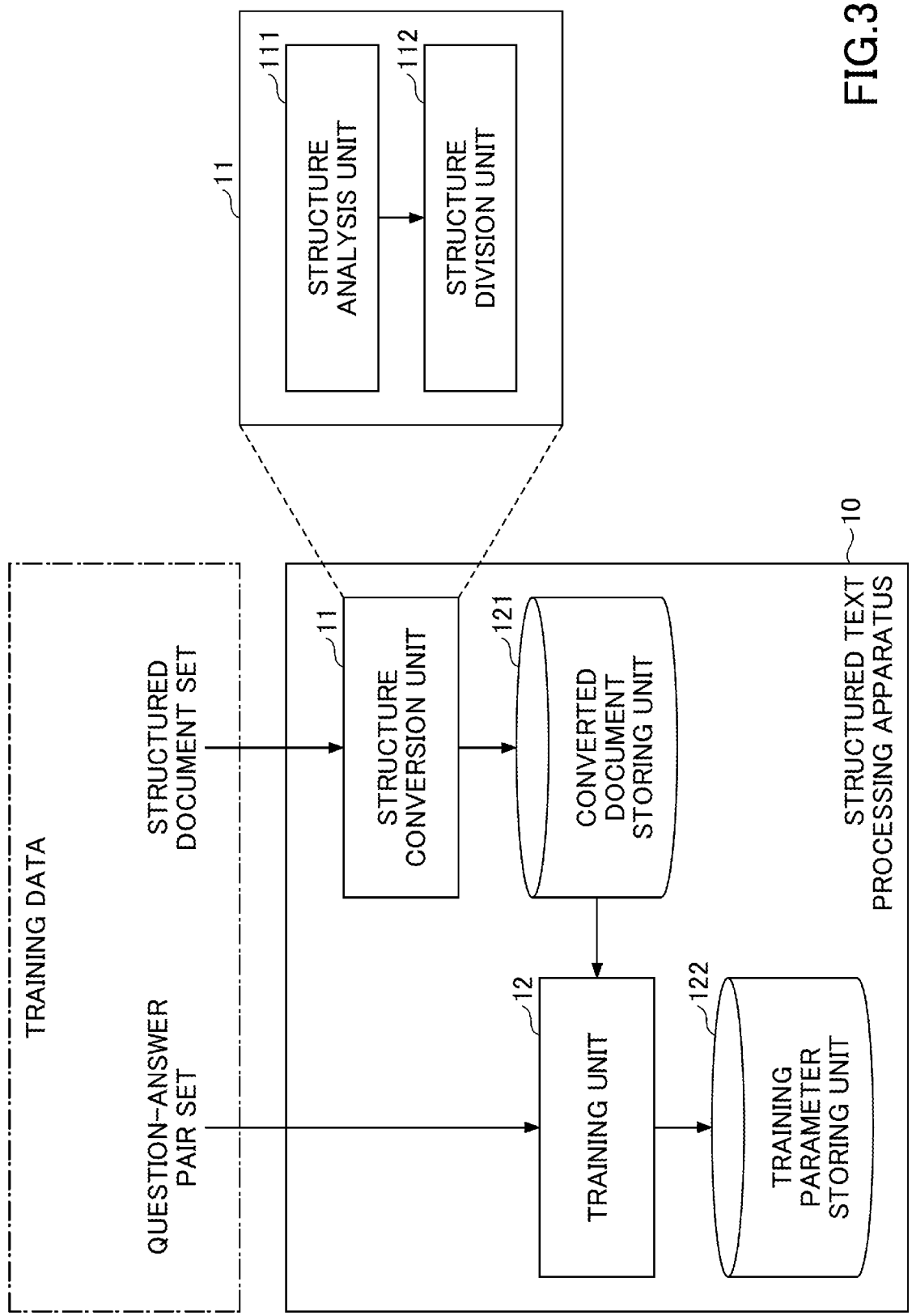
FIG. 3 is a diagram illustrating an example functional configuration of the structured text processing apparatus 10 according to the first embodiment during training.

FIG. 3 is a diagram illustrating an example functional configuration of the structured text processing apparatus 10 according to the first embodiment during training. In FIG. 3, the structured text processing apparatus 10 has a structure conversion unit 11, a training unit 12, and so on. The structure conversion unit 11 includes a structure analysis unit 111 and a structure division unit 112. These units are realized by processing that one or more programs installed in the structured text processing apparatus 10 causes the CPU 104 to execute. The structured text processing apparatus 10 also uses a converted document storing unit 121 and a training parameter storing unit 122. These storing units can be realized by using the auxiliary storage device 102 or a storage device connectable to the structured text processing apparatus 10 via a network, for example. Note that the structure conversion unit 11 and the training unit 12 may be realized by using different computers.

A description will be given below of a processing procedure executed to train the machine reading comprehension model by the structured text processing apparatus 10 of the first embodiment. FIG. 4 is a flowchart for illustrating an example of a processing procedure executed to train the machine reading comprehension model by the structured text processing apparatus 10 of the first embodiment. In FIG. 4, loop processing L1 that includes step S110 and loop processing L2 is executed for each structured text (for each one HTML document) included in a structured text set that constitutes training data. In the following, the structured text to be processed in the loop processing L1 is referred to as a "target document".

In step S110, the structure analysis unit 111 analyzes (extracts or specifies) a hierarchical structure (tree structure) of the target document, and outputs, as the analysis result (extraction result or specification result), information indicating a hierarchical structure (information indicating a superordinate-subordinate structure (parent-child relationship) or a parallel relationship (sibling relationship) between tags); hereinafter referred to as "structural information").

FIG. 5 is a diagram for illustrating analysis of a hierarchical structure. FIG. 5 illustrates an example of structural information s1 that is obtained as the analysis result when an HTML document d1 is the target document. As illustrated in FIG. 5, the structural information s1 is information indicating a tree structure with nodes that are meta strings (tags) and values (hereinafter referred to as "content strings") of elements enclosed by the meta strings. Note that the structural information may be information in any form if a hierarchical structure can be indicated thereby.

Note that any known tool, such as Beautiful Soup (https://www.crummy.com/software/BeautifulSoup/bs4/doc/), may be used for the structure analysis.

Next, the structure division unit 112 executes the loop processing L2 that includes step S120 for each leaf node (each terminal node) of the structure information s1. In the following, a leaf node to be processed in the loop processing L2 is referred to as a "target node".

In step S120, the structure division unit 112 specifies a path from the target node to a root node by recursively tracing parent nodes one-by-one from the target node in the structural information s1, and extracts the specified path as a substructure for the target node. Note that nodes in each path correspond to meta strings and content strings that correspond to the nodes.

FIG. 6 is a diagram illustrating example extraction of substructures. FIG. 6 illustrates an example in which substructures are extracted for all leaf nodes in the structural information s1. That is to say, FIG. 6 illustrates an example in which a hierarchical structure indicated by the structural information s1 is divided into three substructures, namely substructures s1-1 to s1-3. Each of the extracted substructures is one tree structure without branches. As a result of each substructure being one tree structure, the structural meanings that the HTML tags have can be concentrated into only the superordinate-subordinate relationship of the topic. This enables robust machine reading comprehension of HTML documents of various styles.

After step S120 has been executed for all leaf nodes, the structure division unit 112 generates one converted document (hereinafter referred to as a "converted document") for the target document by converting the substructures extracted for the leaf nodes to text of one document, and stores the converted document in the converted document storing unit 121 (S130). Conversion of the substructures to text refers to restoring the substructures to an HTML document. However, in this conversion to text, each tag may be deleted rather than being restored as-is. In this case, the converted document is text data that does not include any meta string. Alternatively, each tag may be converted to a pseudo-word representing structural information, such as "@@@@". In this case, the converted document is text data in which each tag is converted to a common pseudo-word. Furthermore, each tag may be degenerated to a predetermined string indicating that there has been a boundary given by the tag. Such degeneration will be described in detail in the second embodiment. In the following, pseudo-words and degenerated strings are also included in the concept of meta strings. Note that the aforementioned conversion to text may be performed after tags that do not contribute to a hierarchical structure (line feed tags, font tags, span tags etc.) are removed.

After the loop processing L1 has been executed for all structured text (HTML documents) included in the structured text set of the training data, the training unit 12 executes processing to train the machine reading comprehension model with a set of question-answer pairs in the training data and a set of the converted documents as the input to the machine reading comprehension model. The training unit 12 then stores values of training parameters of the reading comprehension model that are obtained as the training results in the training parameter storing unit 122 (S140). The training of the machine reading comprehension model may be performed using any known method. For example, multi-task learning disclosed in NPL 1 may be performed that minimizes the result of combining a loss in an information retrieval task and a loss in a machine reading comprehension task. However, if a meta string is included in a converted document, the meta string may be dealt with as one word during the training processing.

However, if a converted document includes a meta string, information (annotation) indicating correct answer information (for machine reading comprehension, a portion of an answer (answer area) to each question included in the training data) is added to each converted document stored in the converted document storing unit 121. As a result, the converted document with the annotation added is input to the training unit 12. That is to say, the training unit 12 executes training processing with the converted document with the annotation added as the input. Thus, training of the machine reading comprehension model can be promoted with regard to the reading of each meta string (HTML tag) meaning a hierarchical structure in the structured text. Note that the area of the correct answer information indicated by the annotation may be an area delimited by meta strings (between a starting tag and a closing tag), or may be a certain content string, or may be a portion of a certain content string, for example. The correct answer information does not need to be added in the form of an annotation. For example, correct answer information corresponding to the content of a converted document may be input to the training unit 12 separately from the converted document. Here, the "correct answer information corresponding to the content of a converted document" is a string indicating an answer in the case of question answering, and is a correct answer summary sentence created based on the converted document in the case of document summarization, and is the result of classifying each converted document in the case of document classification (if an input document is to be divided into a plurality of converted documents based on a tree structure, the summary sentence and the classification may differ depending on the converted document).

Figure 7:
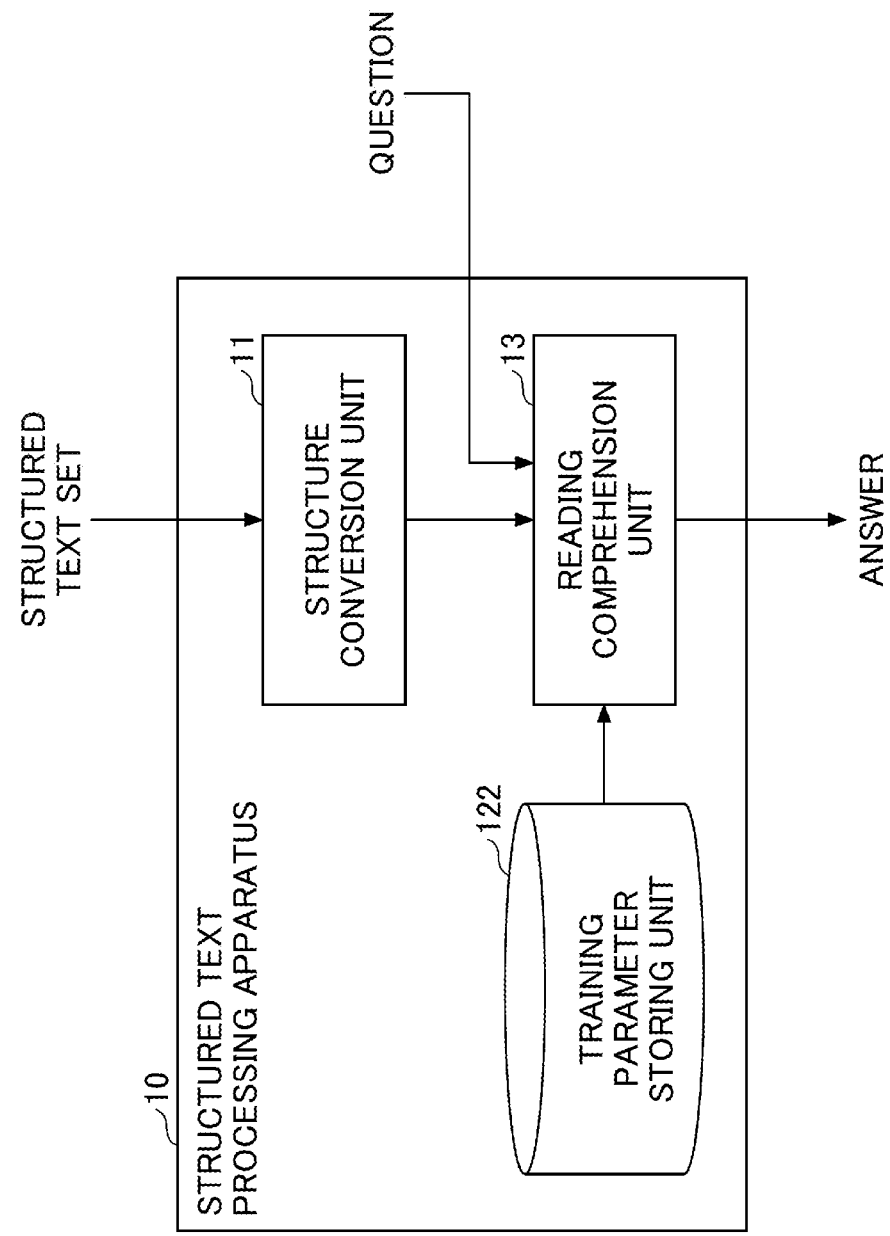
FIG. 7 is a diagram illustrating an example functional configuration of the structured text processing apparatus 10 according to the first embodiment during task execution.

Next, execution of a task (machine reading comprehension) will be described. FIG. 7 is a diagram illustrating an example functional configuration of the structured text processing apparatus 10 according to the first embodiment during task execution. In FIG. 7, the same portions as those in FIG. 3 are assigned the same reference numerals, and a description thereof is omitted.

In FIG. 7, the structured text processing apparatus 10 has a reading comprehension unit 13 instead of the training unit 12. The reading comprehension unit 13 is realized by processing that one or more programs installed in the structured text processing apparatus 10 causes the CPU 104 to execute.

The reading comprehension unit 13 generates a trained machine reading comprehension model by setting the training parameters stored in the training parameter storing unit 122 to the machine reading comprehension model, and inputs a question and a candidate group of documents that include answers to the question to the trained machine reading comprehension model. The candidate group of documents that include answers to the question refers to a set of converted documents generated by the structure conversion unit 11 for the structured text set that is given as the input. The machine reading comprehension model extracts an answer to the question from the set of converted documents, and outputs the extracted answer. Since the converted documents are input to the machine reading comprehension model, the accuracy of the answer to the question regarding what is described in structured text can be improved compared with the case where the structured text is input as-is to the machine reading comprehension model.

For example, if an HTML document displayed as illustrated in FIG. 8 is input, the reading comprehension unit 13 outputs, with respect to a question: "how long is it possible to use if the capacity is added on a daily basis?", an answer: "unlimited use until 23:59 on the same day" based on descriptions p1, p2, p3, and so on.

As described above, according to the first embodiment, structured text is divided into a plurality of converted documents such that the superordinate-subordinate relationship between meta strings and content strings that constitute the structured text is maintained, and such that each converted document does not include content strings in a parallel relationship. Accordingly, the converted documents are generated in a state where the structure in the structured text is reflected therein. Accordingly, application of a neural network to the structured text can be facilitated.

In addition, in the machine reading comprehension technology, "how to read" is learned based on the connection between sentences, the usage of conjunctions, and so on, whereas meta strings included in the converted documents function as pseudo-words that represent the connection between sentences and words. Accordingly, the present embodiment is particularly effective for neural networks for the machine reading comprehension technology.

Although the present embodiment has described an example in which a converted document is generated for each structured text included in a structured text set (i.e., structured text and a converted document have a one-to-one correspondence), a converted document may alternatively be generated for each substructure. In this case, structured text is divided into a plurality of converted documents.

In contrast, in general machine reading comprehension technology (machine reading comprehension technology in which multi-task learning described in NPL 1 is not performed), processing is performed while connecting models of information retrieval (which selects answer extraction candidates from a document set) and machine reading comprehension (which finds an answer from a document) in series. Accordingly, the probability that a document that includes an answer is omitted from the answer extraction candidates is considered to be higher at the point of information retrieval in the case where structured text is divided into a plurality of converted documents (i.e., when structured text and converted documents have a one-to-many correspondence) than in the case where structured text and a converted document have a one-to-one correspondence, or when an unstructured document is input.

However, in the case of applying to a machine reading comprehension model that simultaneously learns information retrieval and machine reading comprehension (performs multi-task learning), the probability that a converted document that includes an answer is omitted from the answer extraction candidates can be lowered even if structured text and converted documents have a one-to-many correspondence, through the multi-task learning of information retrieval and machine reading comprehension.

Next, the second embodiment will be described. In the second embodiment, differences from the first embodiment will be described. Points that are not particularly mentioned in the second embodiment may be the same as the first embodiment. Note that the structure of structured text mainly means a hierarchical structure in the first embodiment; whereas, in the second embodiment, the structure of structured text means additional information (e.g., tree structure, table structure, highlighting structure, link structure etc.) for a content string that is indicated by a meta string or the like. That is to say, although the following description is given while taking a hierarchical structure as an example for convenience, the second embodiment may alternatively be applied to any of the aforementioned structures other than a hierarchical structure.

Figure 9:
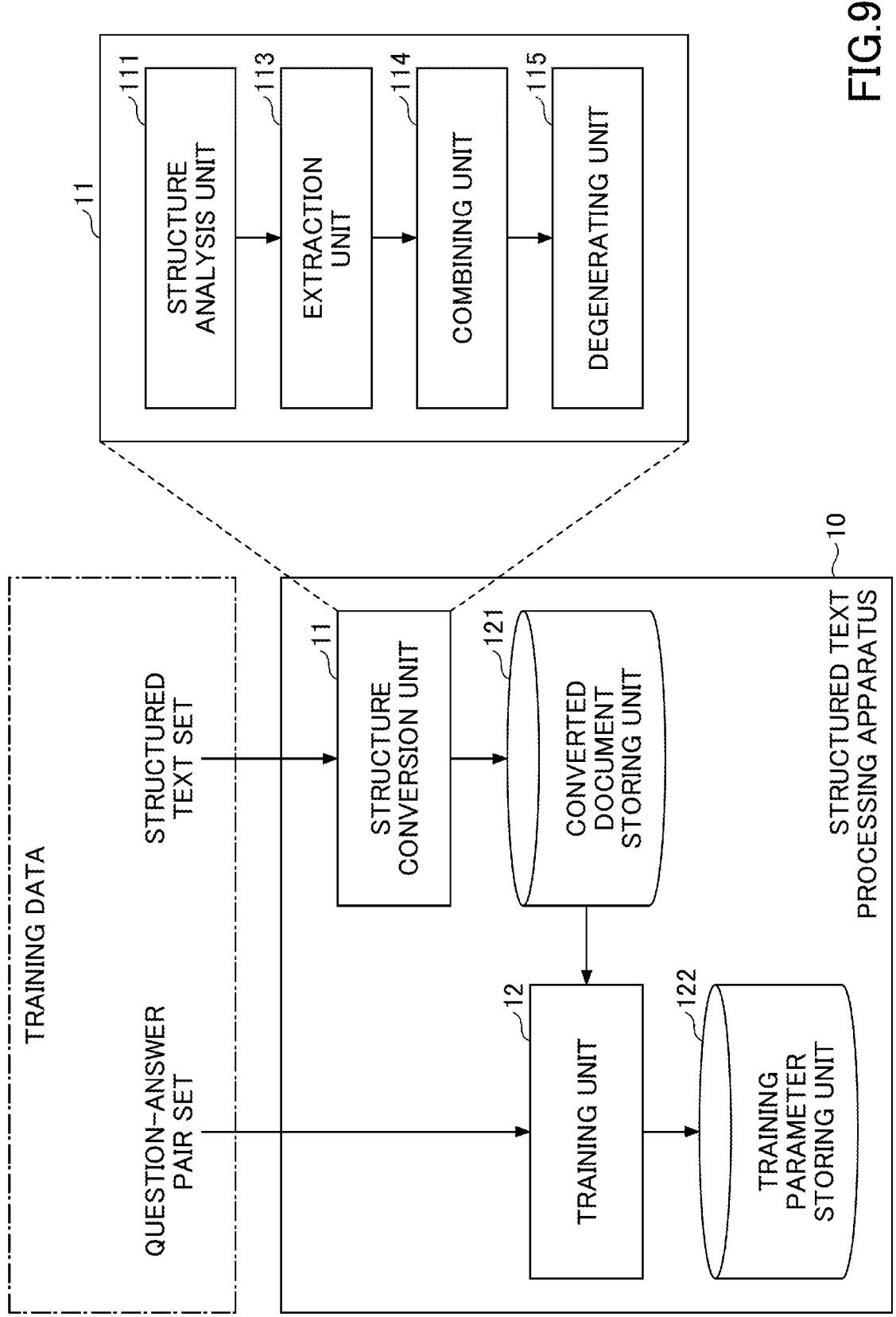
FIG. 9 is a diagram illustrating an example functional configuration of the structured text processing apparatus 10 according to the second embodiment during training.

FIG. 9 is a diagram illustrating an example functional configuration of the structured text processing apparatus 10 according to the second embodiment during training. In FIG. 9 the same portions as those in FIG. 3 are assigned the same reference numerals, and a description thereof is omitted. As illustrated in FIG. 9, the structure conversion unit 11 of the second embodiment does not include the structure division unit 112, but includes an extraction unit 113, a combining unit 114, and a degenerating unit 115. However, in the second embodiment, the structured text processing apparatus 10 does not need to include the degenerating unit 115.

Figure 10:
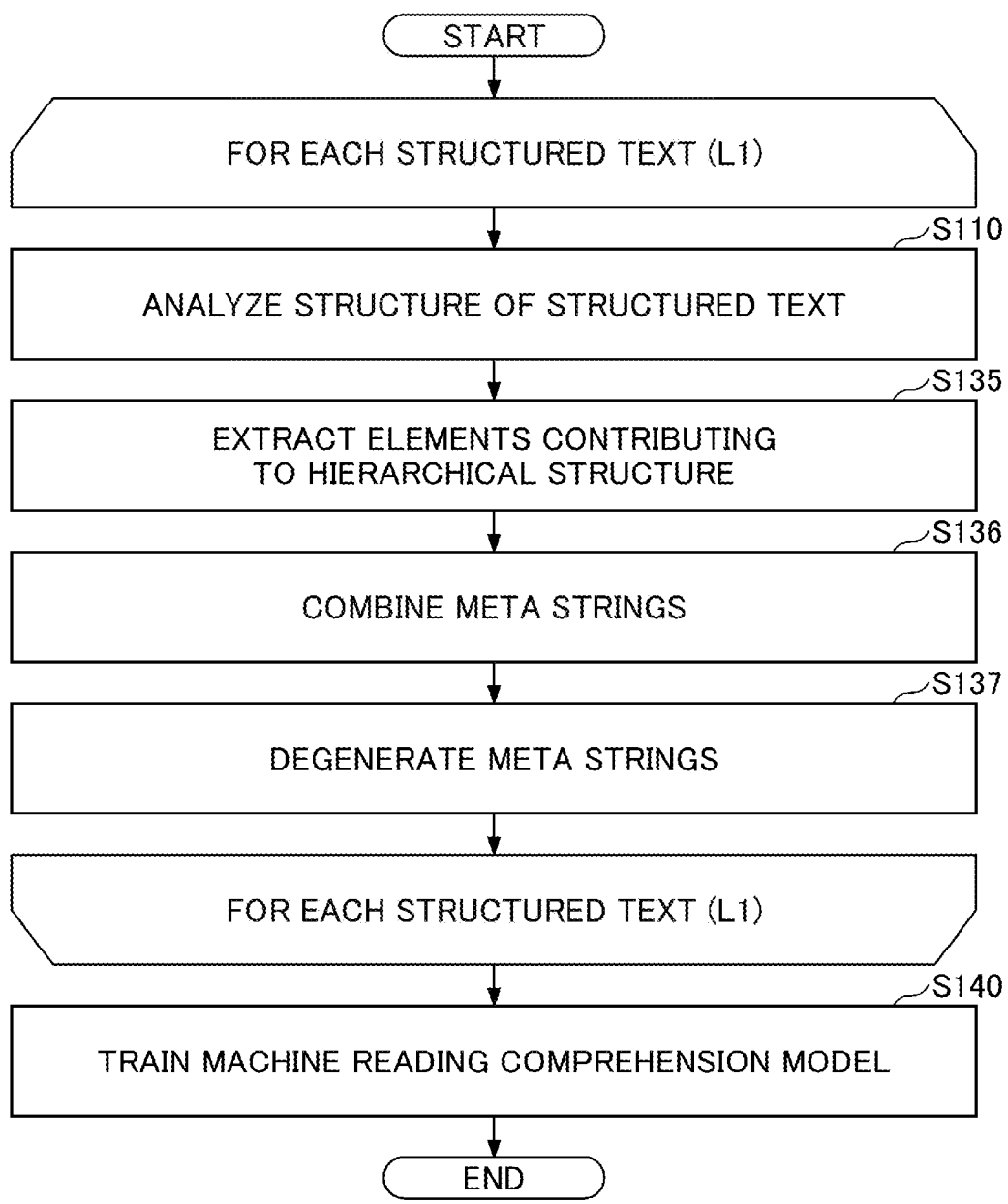
FIG. 10 is a flowchart for illustrating an example of a processing procedure executed to train a machine reading comprehension model by the structured text processing apparatus 10 of the second embodiment.

FIG. 10 is a flowchart for illustrating an example of a processing procedure executed to train the machine reading comprehension model by the structured text processing apparatus 10 of the second embodiment. In FIG. 10, the same steps as those in FIG. 4 are assigned the same step numbers, and a description thereof is omitted.

Following step S110, the extraction unit 113 references the structural information (structural information s1 in FIG. 5) obtained as a result of the structure analysis unit 111 analyzing the structure of the target document, and extracts, from the target document, only information related to a predetermined structure to be extracted, e.g., meta strings and content strings that contribute to a hierarchical structure of the target document (S135). In other words, the extraction unit 113 removes (deletes), from the target document, structural information that does not have the predetermined structure to be extracted, e.g., meta strings that do not contribute to a hierarchical structure of the target document. The meta strings that do not contribute to a hierarchical structure of the target document are meta strings that are not regarded as nodes in the structural information s1. However, if the analysis result obtained by the structure analysis unit 111 simply indicates a superordinate-subordinate relationship and a parallel relationship between meta strings (i.e., if meta strings that do not substantially contribute to a hierarchical structure are also regarded as nodes), the extraction unit 113 removes (deletes) specific meta strings that do not contribute to a hierarchical structure from the target document. The specific meta strings that do not contribute to a hierarchical structure are, for example, line feed tags, font tags, span tags, and the like.

FIG. 11 is a diagram illustrating an example of extraction results obtained by the extraction unit 113. In FIG. 11, (1) is an example in which extracted starting tags, content strings, and closing tags are output in the original format thereof as the extraction result. (2) is an example in which pairs of a starting tag and a content string are output as the extraction result.

Next, the combining unit 114 combines the meta strings and the content strings extracted by the extraction unit 113 (S136).

FIG. 12 is a diagram illustrating example combinations of the meta strings and the content strings. In FIG. 12, an element group (a set of a meta string and a content string) illustrated as [Example Input] is an example of a portion of the target document output from the extraction unit 113. [Example Output] illustrates examples of the combination result for [Example Input]. FIG. 12 illustrates six examples (a) to (f).

(a) is an example in which all of the meta strings and the content strings output from the extraction unit 113 are combined as-is (i.e., an example in which no particular processing is performed by the combining unit 114). (b) is an example in which only the starting tags are combined with the content strings (an example in which the closing tags are omitted (removed). (c) is an example in which only the closing tags are combined with the content strings (an example in which the starting tags are omitted (removed)). (d) is an example in which the closing tag and the starting tag between continuous content strings are combined with these content strings. (e) is an example in which only the starting tag between the continuous content strings are combined with these content strings. (f) is an example in which only the closing tag between the continuous content strings are combined with these content strings.

Note that processing in any of the examples (a) to (f) may be employed. At the time of the combination, the combining unit 114 may also convert a line feed code or continuous spaces included in the target document to one space.

Next, the degenerating unit 115 degenerates each meta string into information that only indicates that there has been a meta string (a boundary of a hierarchical structure) between the content strings by converting all meta strings in the target document output from the extraction unit 113 to a predetermined string (e.g., <TAG> etc.) (S137).

FIG. 13 is a diagram illustrating example degeneration of meta strings. FIG. 13 illustrates (a') to (f'), which are examples of the degeneration results for (a) to (f) illustrated in FIG. 12. Although FIG. 13 illustrates examples in which each meta string is converted to <TAG>, any string other than <TAG> may be used as a degenerated string.

Note that in the second embodiment, the result of the degenerating unit 115 degenerating meta strings is the converted document for the target document. However, step S137 is executed if the structured text processing apparatus 10 has the degenerating unit 115. If the structured text processing apparatus 10 does not have the degenerating unit 115, a document output from the combining unit 114 is used as the converted document for the target document.

After the loop processing L1 has been executed for all structured text (HTML documents) included in the structured text set of the training data, the training unit 12 executes training processing for the machine reading comprehension model with a set of question-answer pairs of the training data and a set of converted documents as the input to the machine reading comprehension model, and stores values of training parameters of the reading comprehension model that are obtained as the training results in the training parameter storing unit 122 (S140).

Here, in the second embodiment, if the structured text processing apparatus 10 has the degenerating unit 115, each meta string has been degenerated to a common string indicating that the meta string has been present. Accordingly, improvement of the training efficiency of the machine reading comprehension model can be expected.

In other words, in the case of HTML tags, there is a high degree of freedom in how the tags are used and how the tags are written. Therefore, HTML tags can be used in various manners to express the same structure. To have the machine reading comprehension model learn general reading of HTML tags, it is necessary to prepare a large number of HTML files written in various styles and writings, which is costly. For this reason, the second embodiment focuses on boundaries of HTML tags. The second embodiment only focuses on a predetermined structure (hierarchical structure or the like in the present embodiment) that is important for predetermined processing at a later stage, and the focused structural information is converted in accordance with the structure. Information other than the information regarding the focused structure may be deleted. This is because what is important for the understanding of a hierarchical structure is not the meaning of HTML tags but is to understand that there is a semantic connection between continuous text enclosed by different tags. Accordingly, the second embodiment makes it possible to train the machine reading comprehension model that absorbs fluctuations in the usage of HTML tags by applying machine reading comprehension to text in which information that the HTML tags have, such as "information that only indicates whether or not there has been an HTML tag boundary", is degenerated to some extent, rather than making HTML tags themselves into text. This enables robust machine reading comprehension of HTML files of various styles. Note that "different tags" mean the difference in tag type, such as <h2> and <h3>, rather than the difference between a starting tag and a closing tag, such as <h1> and </h1>.

In general, in natural language processing using neural networks, each word included in an input document is converted to an embedded vector. Here, codebooks created in advance using a large-scale corpus or the like are often used for embedded vectors of ordinary words (words used in natural language). However, such codebooks do not support embedded vectors corresponding to meta strings (also including degenerated strings) that are used in the present embodiment and mean a hierarchical structure.

For this reason, an appropriate initial value is set as an embedded vector corresponding to each meta string before the training of the machine reading comprehension model, and is updated during the training of the machine reading comprehension model. Alternatively, an embedded vector corresponding to a meta sting may be obtained using a set of converted structured text by means of a technique similar to the technique of creating an embedding vector for a general word. The same applies to the first embodiment.

In addition, information (annotation) indicating correct answer information (for machine reading comprehension, a portion of an answer (answer area) to each question contained in the training data) is added to each structured text included in the training data. As a result, the converted document with the annotation added is input to the training unit 12. That is to say, the training unit 12 executes training processing with the converted document with the annotation added as the input. Thus, an embedded vector representing the relationship between content strings can be learned for meta strings representing a tree structure of structured text, and the training of the machine reading comprehension model can be promoted for the reading of meta strings in the structured text (converted document). Note that the area of the correct answer information indicated by the annotation may be the same as that of the first embodiment.

Note that the task execution of the structured text processing apparatus 10 may be the same as the first embodiment. However, the processing procedure executed by the structure conversion unit 11 is as described with reference to FIG. 10. In the second embodiment, if the structured text processing apparatus 10 has the degenerating unit 115, a document in which each meta string is degenerated is input to the machine reading comprehension model. Accordingly, even if an unknown meta string is included in structured text, it can be expected that a decrease in the task accuracy is suppressed.

As described above, the second embodiment can also facilitate the application of a neural network to structured text.

Although the description has been given above while taking a hierarchical structure as an example of the predetermined structure to be executed, the predetermined structure to be extracted may be a highlighting structure indicated by the font size, color specification, or the like, or a link structure indicated by anchor text, for example.

Although the second embodiment has described an example in which meta strings that do not contribute to a hierarchical structure are removed by the extraction unit 113, a configuration may alternatively be employed in which meta strings, anchor text, and the like related to highlighting of content strings that are indicated by the font size, color specification, or the like are not removed even though they do not contribute to a hierarchical structure. In this case, the degenerating unit 115 may use different degenerating methods for meta strings that contribute to the type of structure, i.e., a hierarchical structure, meta strings that contribute to highlighting, and anchor text, rather than converting all meta strings to a common string. Specifically, the degenerating unit 115 may change degenerated strings for meta strings that contribute to a hierarchical structure, meta strings that contribute to highlighting, and anchor text. In this case, a conversion table indicating degenerated (converted) strings for each meta string may be created in advance, and the degenerating unit 115 may degenerate (convert) meta strings while referencing the conversion table. Note that anchor text refers to, for example, the portion "here" in "For . . . , please see <a href="URL">here</a>".

An example has been described above in which a tag string is degenerated (converted) to a string that has no meaning as natural language (e.g., <TAG>). However, the degenerating unit 115 may convert a tag string to a string that has a meaning as natural language and that represents a superordinate-subordinate relationship (target or association) (e.g., "regarding", "with regard to" etc.). This eliminates the need to prepare special training data and model training for the purpose of processing structured text. Accordingly, a task can be executed using a model that has been trained using unstructured text as training data.

Conversion of a string representing such conversion (superordinate-subordinate relationship (target or association) (e.g., "regarding", "with regard to" etc.)) to a tag string may be executed by the structure division unit 112 in the first embodiment.

Next, the third embodiment will be described. In the third embodiment, differences from the first and second embodiments will be described. Points that are not particularly mentioned in the third embodiment may be the same as the first or second embodiment.

Figure 14:
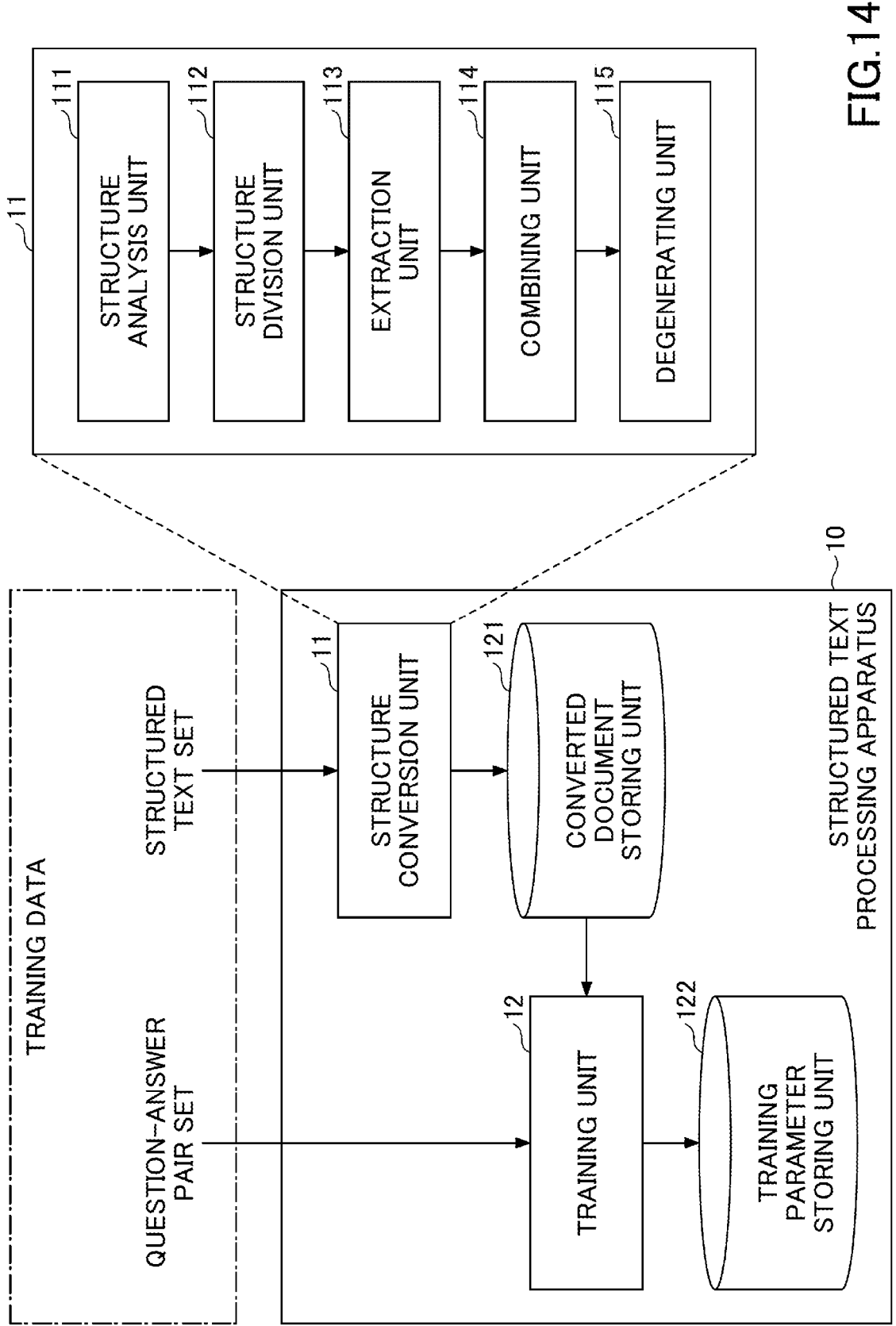
FIG. 14 is a diagram illustrating an example functional configuration of the structured text processing apparatus 10 according to the third embodiment during training.

FIG. 14 is a diagram illustrating an example functional configuration of the structured text processing apparatus 10 according to the third embodiment during training. In FIG. 14, portions that are the same as or corresponding to those in FIG. 3 or 9 are assigned the same reference numerals, and a description thereof is omitted as appropriate. As illustrated in FIG. 14, the structure conversion unit 11 of the third embodiment have a structure that is a combination of the first and second embodiments.

Figure 15:
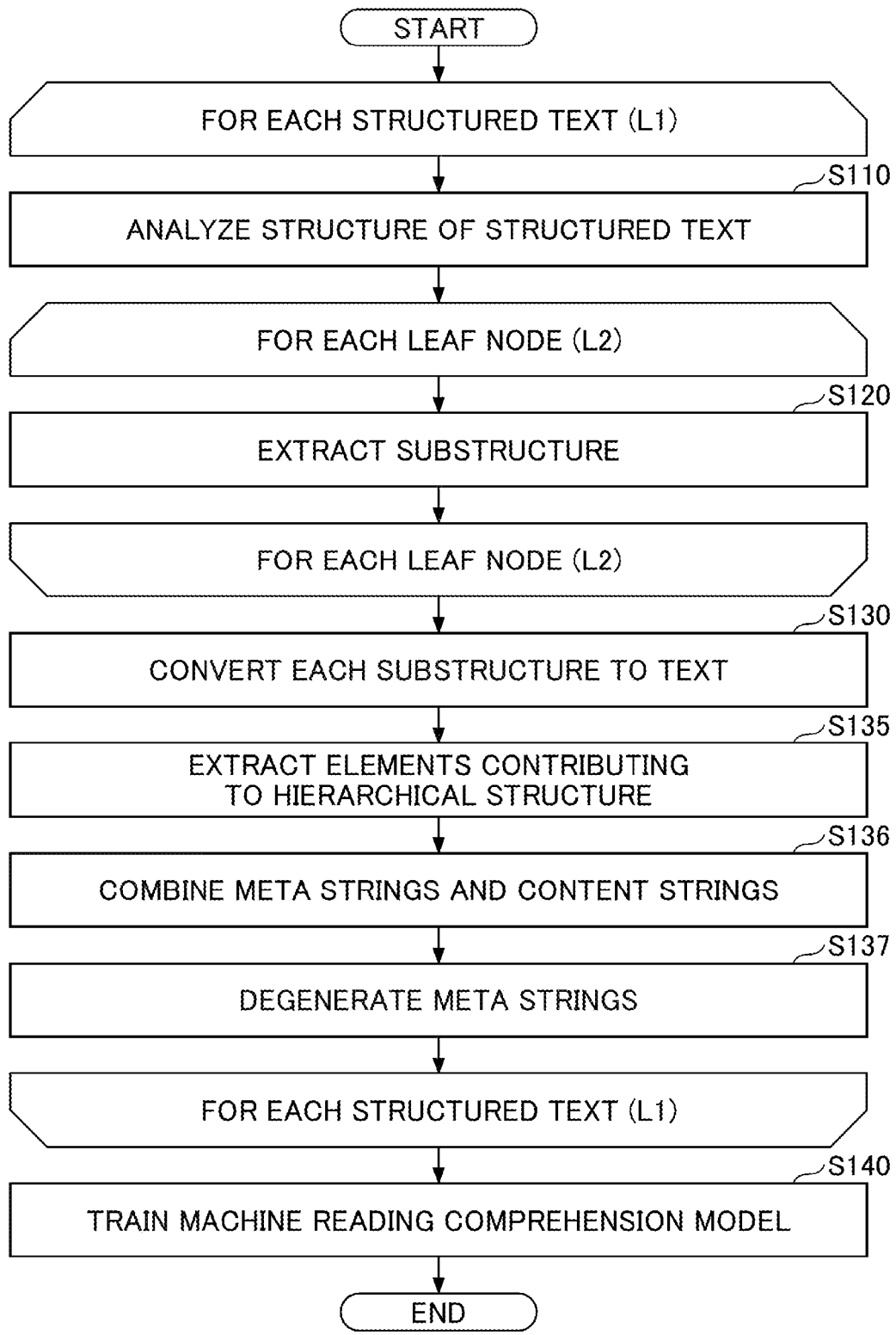
FIG. 15 is a flowchart for illustrating an example of a processing procedure executed to train the machine reading comprehension model by the structured text processing apparatus 10 of the third embodiment.

FIG. 15 is a flowchart for illustrating an example of a processing procedure executed to train the machine reading comprehension model by the structured text processing apparatus 10 of the third embodiment. In FIG. 15, the same steps as those in FIG. 4 or 10 are assigned the same step numbers, and a description thereof is omitted as appropriate.

In FIG. 15, steps S135 to S137 are executed following the loop processing L2 and step S130. That is to say, a document output from the structure division unit 112 (the converted document in the first embodiment) is input to the extraction unit 113, step S135 and subsequent steps are executed, and a document output in step S137 is input as a converted document to the training unit 12.

Accordingly, according to the third embodiment, the effects achieved in the first and second embodiments can be achieved.

Note that, in the above embodiments, if an element indicating a table (including a matrix) included in structured text (e.g., an element enclosed by <Table> tags) is processed similarly to the other elements, there is a possibility that the correspondence relationship between values of rows and columns in the table will be lost. For this reason, for the table, the structure division unit 112, the degenerating unit 115, or the like may comprehend that the element indicates a table and perform special conversion processing when converting to text.

FIG. 16 is a diagram illustrating example conversion of a table. In FIG. 16, (1) illustrates an example display of a table included in structured text. (2) and (3) illustrate examples of the conversion of this table. (2) is an example in which meta strings are degenerated. (3) is an example in which the conversion is performed while a superordinate-subordinate relationship and other relationships (e.g., "and", "or", "superordinate-subordinate", "parallel" etc.) between meta strings are distinguished. In both (2) and (3), each row expresses the price for a combination of a column (plan) and a row (service). As a result, the machine reading comprehension model can be expected to learn answers to questions regarding the price for each combination of a plan and a service.

Note that the task execution of the structured text processing apparatus 10 may be the same as the first embodiment. However, the processing procedure executed by the structure conversion unit 11 is as described with reference to FIG. 15.

As described above, according to the third embodiment, meta strings are converted after structured text is divided into substructures. As a result, meta strings that are present in the same hierarchical structure within a tree indicating a structure are no longer present when meta strings are converted, and the meaning of the meta strings becomes clearer. Thus, the third embodiment is considered to be the most effective configuration among the above three embodiments.

Next, a description will be given of the results of experiments conducted regarding the first and third embodiments by the inventor of the present application.

Structured text subjected to this experiment is a manual for operators for a certain service, and the training data is as follows.

Number of html elements: 38/Number of QA pairs: 22129

Also, the following two types of evaluation sets (question groups used during task execution) were prepared. Evaluation set A: a question group created by a person who comprehends the machine reading comprehension technology (questions friendly to the machine reading comprehension technology)

Evaluation Set B: a question group created by a person who has never used the machine reading comprehension technology (questions more natural to people)

A correct answer was regarded as being obtained if a correct answer was included in the top five answer results obtained by machine reading comprehension, and partial match as well as exact match was regarded as a correct answer.

FIG. 17 illustrates the experimental results of the experiments. FIG. 17 illustrates the experimental results (correct answer rates) for the evaluation sets A and B under three types of conditions of the combination of "unit of division" and "degeneration of meta strings". Specifically, the first condition (hereinafter referred to as "condition 1") is that the "unit of division" is a paragraph unit (e.g., a header of an HTML document), and meta strings are not degenerated. The second condition (hereinafter referred to as "condition 2" is that the "unit of division" is a leaf node unit, and meta strings are not degenerated. The third condition (hereinafter referred to as "condition 3" is that the "unit of division" is a leaf node unit, and meta strings are degenerated.

Here, the "unit of division" being a leaf node unit indicates that the processing performed by the structure division unit 112 that has been described in the first embodiment is applied. The "degeneration of meta strings" indicates whether or not the processing performed by the degenerating unit 115 that has been described in the second embodiment is applied. Accordingly, the condition 1 corresponds to a condition that none of the above embodiments is applied, the condition 2 corresponds to a condition that the first embodiment is applied, and the condition 3 corresponds to a condition that the third embodiment is applied.

According to FIG. 17, it can be understood that, for both evaluation sets, the correct answer rate under the condition 2 is higher than that under the condition 1, and the correct answer rate under the condition 3 is higher than that under the condition 2. That is to say, the effects of the present embodiments were also confirmed by the experiments.

Note that, as for the structured text processing apparatus 10 of any of the above embodiments, different computers may be used to realize the training and the task execution.

Note that the structured text processing apparatus 10 is also an example of a structured document processing learning device in the above embodiments. The structure analysis unit 111 is an example of an analysis unit. The degenerating unit 115 is an example of a conversion unit. The reading comprehension unit 13 is an example of a processing unit.

Although the embodiments of the present invention have been described in detail, the present invention is not limited to those specific embodiments, and various modifications and changes may be made within the scope of the gist of the present invention described in the claims.

REFERENCE SIGNS LIST

10 Structured text processing apparatus
11 Structure conversion unit
12 Learning unit
13 Reading comprehension unit
100 Drive device
101 Recording medium
102 Auxiliary storage device
103 Memory device
104 CPU
105 Interface device
111 Structure analysis unit
112 Structure division unit
113 Extraction unit
114 Combination unit
115 Degenerating unit
121 Converted document storing unit
122 Training parameter storing unit
B Bus

The invention claimed is:

1. A structured text processing learning apparatus comprising:
a memory, and
a processor configured to:
extract, from the structured text, context strings that contribute to a hierarchical structure among a plurality of meta strings representing the hierarchical structure of the structured text and context strings delimited by the meta strings,
combine the extracted context strings,
generate a converted document from a result of combining the extracted context strings by converting the plurality of meta strings included in the result into a common string, and
train a neural network for executing predetermined processing for the converted document, using, as input, the generated converted document and correct answer information for performing the predetermined processing.

2. The structured text processing learning apparatus according to claim 1,
wherein the processor is further configured to convert each string that is included in the information related to the structure and indicate the structure to a common string representing that the string has been present.

3. The structured text processing learning apparatus according to claim 1,
wherein the processor is further configured to perform multi-task learning of information retrieval and machine reading comprehension for the neural network.

4. A structured text processing apparatus comprising:
a memory, and
a processor configured to:
cause the neural network trained by the structured text processing learning apparatus according to claim 1 to execute the predetermined processing related to structured text.

5. A non-transitory computer-readable recording medium having stored therein a program causing a computer to function as the structured text processing apparatus according to claim 4.

6. A computer-implemented structured text processing method comprising:
causing the neural network trained by the structured text processing learning apparatus according to claim 1 to execute the predetermined processing related to structured text.

7. A non-transitory computer-readable recording medium having stored therein a program causing a computer to function as the structured text processing learning apparatus according to claim 1.

8. A computer-implemented structured text processing learning method comprising:
extracting, from the structured text, context strings that contribute to a hierarchical structure among a plurality of meta strings representing the hierarchical structure of the structured text and context strings delimited by the meta strings,
combine the extracted context strings;
generating a converted document from a result of combining the extracted context strings by converting the plurality of meta strings included in the result into a common string including text data in which each string indicating a structure of the extracted information has been converted, in accordance with the structure related to the extracted information; and
training a neural network for executing predetermined processing for the converted document, using, as input, the converted document generated in the conversion step and correct answer information for performing the predetermined processing.

* * * * *